United States Patent [19]

Tatsumi et al.

[11] 4,184,263
[45] Jan. 22, 1980

[54] APPARATUS FOR MEASURING THE WAVINESS OF A WORKPIECE SURFACE

[75] Inventors: Youji Tatsumi, Funabashi; Masuo Hachisu, Narashino, both of Japan

[73] Assignee: Seiko Seiki Kabushiki Kaisha, Japan

[21] Appl. No.: 818,961

[22] Filed: Jul. 25, 1977

Related U.S. Application Data

[63] Continuation-in-part of Ser. No. 715,055, Aug. 17, 1976, abandoned, which is a continuation of Ser. No. 533,530, Dec. 17, 1974, abandoned.

[30] Foreign Application Priority Data

Dec. 17, 1973 [JP] Japan ................. 48/141508

[51] Int. Cl.$^2$ ................. G01B 7/12; G01B 7/31; G06G 7/78
[52] U.S. Cl. ................. 33/178 E; 33/174 Q; 364/560
[58] Field of Search ............ 33/174 L, 174 Q, 174 P, 33/178 E; 235/151.3, 151.32; 364/560, 61, 572

[56] References Cited

U.S. PATENT DOCUMENTS

| | | | |
|---|---|---|---|
| 3,180,031 | 4/1965 | Roeger et al. | 33/174 Q |
| 3,222,791 | 12/1965 | Huntley et al. | 33/174 Q |
| 3,615,143 | 10/1971 | Barr et al. | 33/178 E |

FOREIGN PATENT DOCUMENTS 1529837  5/1968  France ................. 33/174 Q

Primary Examiner—Richard R. Stearns
Attorney, Agent, or Firm—Robert E. Burns; Emmanuel J. Lobato; Bruce L. Adams

[57] ABSTRACT

An apparatus for measuring the roundness and waviness of workpiece surfaces comprises a first peak-to-peak detector for detecting the absolute peak-to-peak value of the sum of a signal representative of the roundness error of the workpiece and a signal representative of the eccentric center of the workpiece. A low-pass filter passes only the low frequency eccentricity signal which is applied to a second peak-to-peak detector for detecting the absolute peak-to-peak value thereof. The outputs from both detecting devices are fed to an arithmetic means for effecting subtraction of the absolute value of the output signal from the second peak-to-peak detector from that of the first peak-to-peak detector thereby obtaining a signal representative of the peak or maximum amount of waviness of the workpiece surface at or near the point of maximum eccentricity error and unaffected by any eccentricity error.

3 Claims, 4 Drawing Figures

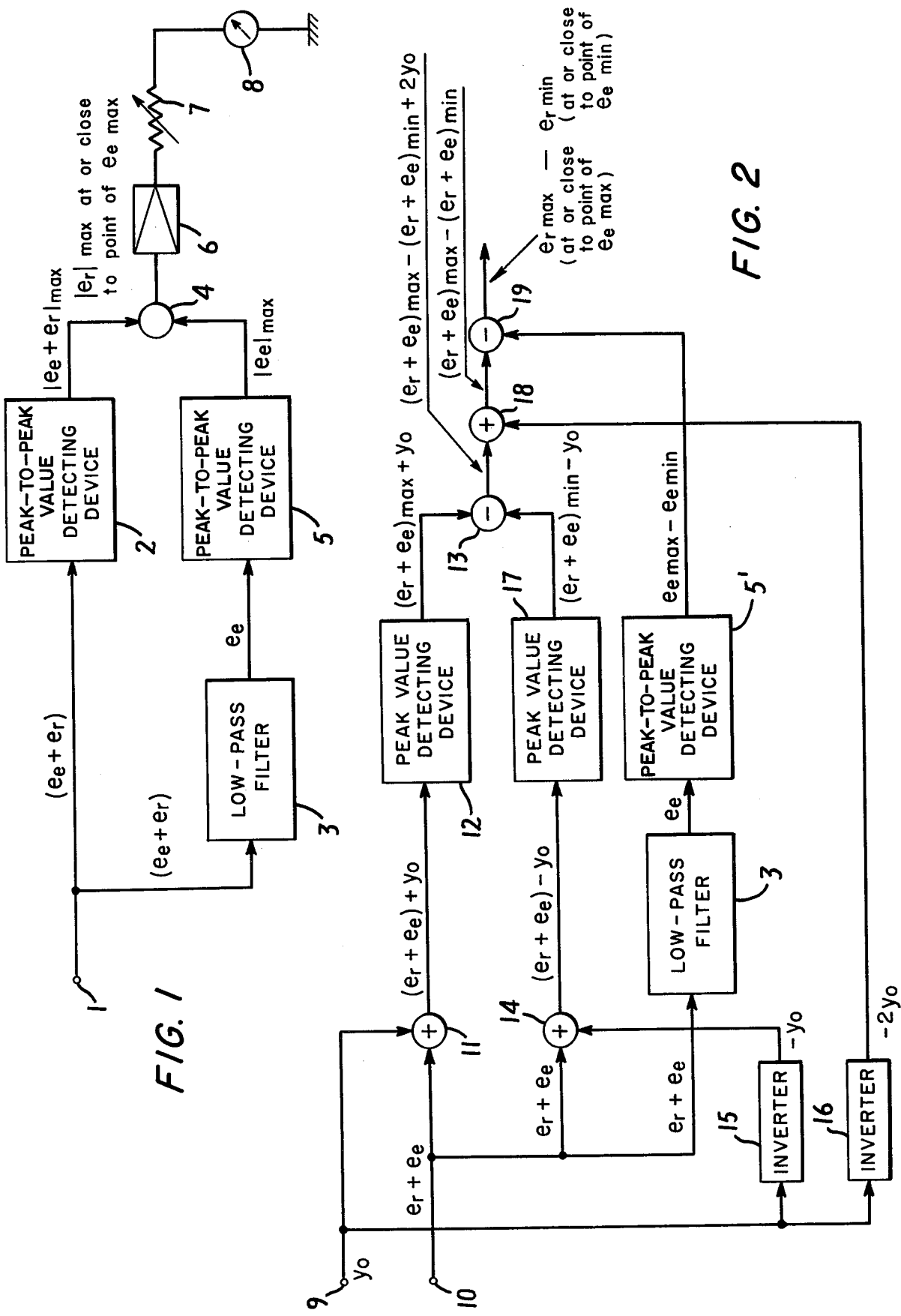

APPARATUS FOR MEASURING THE WAVINESS OF A WORKPIECE SURFACE

RELATED APPLICATIONS

This is a continuation in-part application of prior copending application No. 715,055 filed Aug. 17, 1976 and now abandoned, and which was a continuation application of prior copending application Ser. No. 533,530 filed Dec. 17, 1974 and now abandoned.

BACKGROUND OF THE INVENTION

The present invention relates to an apparatus for effecting measurement of the roundness of a workpiece, and more particularly to an apparatus for effecting the measurement of the roundness of a workpiece with various arithmetic means.

It is known that an output signal representative of the roundness of a workpiece inevitably contains a run-out signal component due to the eccentric center of the workpiece and to the positional error of the detector caused by machine vibrations. This results in inaccurate measurement of the roundness of the workpiece. Generally it is known that the signal representative of the run-out or eccentricity of the workpiece is of low frequency while the signal representative of the roundness error is of high frequency.

Certain techniques are already known for eliminating the run-out signal of the workpiece. According to one such prior technique, a high-pass filter is provided through which passes only the high frequency roundness error signal. However, the use of the high-pass filter is disadvantageous in that wave distortion occurs, in passing the filter, when the signal is at negative voltage. This seriously affects the signal representative of the roundness error of the workpiece, so that it is impossible to more accurately effect measurement of the workpiece roundness.

SUMMARY OF THE INVENTION

It is therefore an object of the present invention to provide an apparatus for measuring the roundness of a workpiece with high accuracy wherein two signals are detected by a detector which detects the workpiece size, that is, signals representative of the roundness error of the workpiece and of the run-out or eccentricity error caused by an eccentric center of the workpiece. As used herein, the term "roundness error" refers to the random fluctuations and waviness of the workpiece circumference such as are caused by tool-chatter and vibration during the cutting or grinding of the workpiece. Further, the detector is provided at an output with a peak-to-peak detector which is adapted to take out the absolute value of the sum of the two signals. At the output of the detector is also provided a low-pass filter which passes only the low frequency run-out signal. The signals from the low-pass filter are applied to a second peak-to-peak detector and the output from the second and the first mentioned peak-to-peak detectors are combined in an arithmetic operation whereby the actual roundness error of the workpiece is determined.

It is another object of this invention to provide an apparatus for measuring the roundness of a workpiece with high accuracy wherein the measurement of the roundness error is carried out in such a manner that a certain voltage is set previously in accordance with the positional error of a detector which detects the ground or machined workpiece surface, and this set voltage value is arithmetically combined with an output signal representative of the workpiece roundness error to compensate for detector positional error.

BRIEF DESCRIPTION OF THE DRAWINGS

FIG. 1 is a block diagram showing an embodiment of an apparatus according to the present invention for measuring the waviness of a workpiece surface;

FIG. 2 is a block diagram showing another embodiment of the present invention;

DESCRIPTION OF THE PREFERRED EMBODIMENTS

Figure 3A:
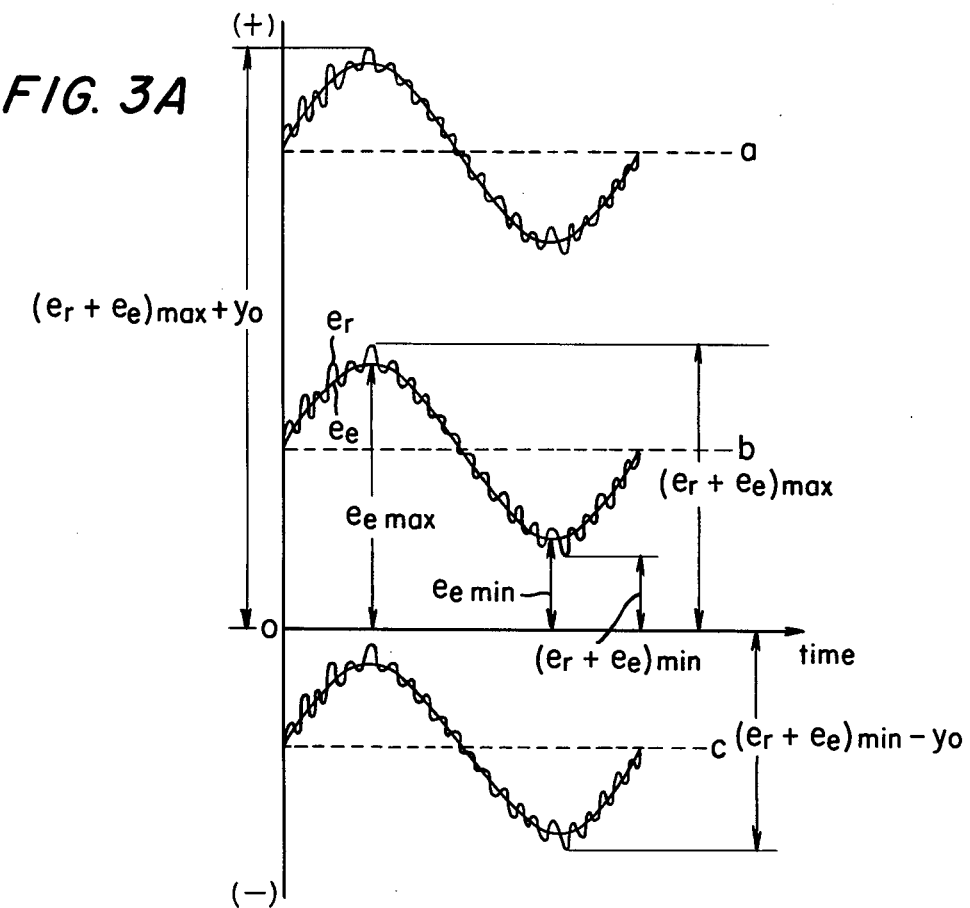
FIG. 3A is a graphical representation showing the relationship between an output signal from the detector and a previously set voltage in respect of the embodiment of the invention depicted in FIG. 2.

Referring now to FIG. 1, there is illustrated an apparatus for effecting measurement of the roundness of workpieces, wherein reference numeral 1 is a terminal to which is applied an output signal detected by a detector (not shown) for detecting the workpiece size. As is known in the art, this output signal contains two signals, one of which is a signal $e_e$ representative of the run-out caused by the eccentricity of the workpiece, the other of which is a signal $e_r$ representative of the roundness error of the workpiece. In connection with the run-out or eccentricity signal, when the workpiece is not eccentrical, or in other words, when the workpiece is concentric, the output signal equals zero (0). In case of carrying out the roundness-measuring when the workpiece is rotating about an eccentric axis, the eccentricity output signal $e_e$ caused thereby occurs and takes the form of sine waves. In contrast, the roundness error output signal $e_r$ caused by the waviness and fluctuations of the workpiece surface takes the form of random waves.

The terminal 1 is connected to the input side of a peak-to-peak detector 2 and a low-pass filter 3, and the output side of the detector 2 is connected to one input of an arithmetic means 4. The output of the low-pass filter 3 is connected to the other input of the arithmetic means 4 through a peak-to-peak detector 5, and the output side of the arithmetic means 4 is connected to an amplifier 6 whose output is connected to a level-adjusting means, such as a variable resistance, and an indicator 8.

In the operation of the above described apparatus, an output signal detected by a detecting device, that is, the total signal $(e_e+e_r)$ composed of run-out signal $e_e$ and roundness error signal $e_r$ of the workpiece, is applied to the terminal 1. This total signal $(e_e+e_r)$ is then applied to the peak-to-peak detector 2 and the low-pass filter 3.

The peak-to-peak detector 2 develops an absolute value signal $|e_e+e_r|$max as a result of detecting the peak-to-peak value of the signal $(e_e+e_r)$, thereby applying the absolute peak-to-peak value to the arithmetic means 4. On the other hand, the low-pass filter 3 is effective to pass only the low frequency run-out signal $e_e$ of the total signal $(e_e+e_r)$ to the peak-to-peak value-detecting device 5 through which an absolute value signal $|e_e|$max is detected and delivered therefrom as an output signal which is applied to the arithmetic means 4.

The arithmetic means executes subtraction of the output signals from peak-to-peak value-detecting devices 2 and 5. That is to say, the means 4 subtracts $|e_e|$max from $|e_e+e_r|$max, and the output $|e_r|$max (at or close to the point of ($e_e$) max) is applied to an amplifier 6. This output signal $|e_r|$max represents the absolute value of the roundness error of the workpiece at or near the point of maximum eccentricity error whereby the roundness error of the ground workpiece and its degree of surface waviness can be obtained.

Then, this absolute value of roundness error is amplified by the amplifier and is adjustable by a level adjusting means 7. An indicator 8 indicates the absolute value $|e_r|$max of the signal representative of the roundness error at or near the point of maximum eccentricity error, at the end of one workpiece revolution. The peak-to-peak detectors 2,5 maintain the maximum peak-to-peak values detected during a revolution of the workpiece and the difference between the respective values detected by detectors 2 and 5 is shown by the indicator 8 at the end of the workpiece revolution.

In FIG. 2 there is shown another embodiment of the invention. Reference numeral 9 is a terminal to which is impressed a previously set voltage $y_o$ whose value is a function of the positional error of the detector itself from a given reference position. The workpiece is detected by the detector (not shown) which generates an output signal ($e_e+e_r$) which is applied to a terminal 10. The total signal ($e_e+e_r$) and the above mentioned set voltage $y_o$ are applied to an arithmetic means 11, and the summation of ($e_e+e_r$) and $y_o$ is carried out.

When, for example, the signal ($e_e+e_r$) has a level b as shown in FIG. 3A, it changes in upper and lower directions due to the fluctuation of the detector position. When, therefore, the signal ($e_e+e_r$) is directly applied to the peak value-detecting device 12, the fluctuations in the upper and lower directions are added to the actual roundness error. Accordingly another feature of the present invention is application of the signal ($e_e+e_r$) to the arithmetic means 11 whereat a previously set voltage $y_o$ is added to the signal ($e_e+e_r$). In consequence thereof, level b changes to level a.

An output signal ($e_e+e_r$)+$y_o$ from the arithemetic means 11 is applied to the peak value-detecting device 12, and the maximum value ($e_e+e_r$)max of the signal ($e_r+e_e$)+$y_o$ is detected. Thus, from the output of the device is delivered an output signal ($e_e+e_r$)max+$y_o$, which is applied to an arithmetic means 13.

The signal ($e_r+e_e$) applied to the terminal 10 is further applied to the arithmetic means 14. The set voltage $y_o$ is applied to inverters 15 and 16 through which $y_o$ is changed from positive to negative. These two values, that is, the set value ($-y_o$) and the signal ($e_r+e_e$), are applied to the arithmetic means 14, and then the subtraction ($e_r+e_e$)−$y_o$ is carried out. In this case, the value $y_o$ is determined to such an extent that the relationship ($e_r+e_e$)−y>0 is maintained. As a result, this changes the level of the signal ($e_r+e_e$) from b to c as shown in FIG. 3A.

In the same manner, an output signal ($e_e+e_r$)−$y_o$ from the arithmetic means 14 is applied to a negative peak value-detecting device 17, so that the minimum value ($e_r+e_e$)min and the above value ($-y_o$) are added to obtain an output signal ($e_r+e_e$)min−$y_o$.

To the arithmetic means 13 are applied two signals from the peak value-detecting devices 12 and 17, that is to say, the signal ($e_r+e_e$)max+$y_o$ and the signal ($e_r+e_e$)min−$y_o$. When these two signals are applied to the arithmetic means 13, the subtraction thereof is carried out and this results in ($e_r+e_e$)max+$y_o$−($e_r+e_e$)min−$y_o$=($e_r+e_e$)max−($e_r+e_e$)min+2$y_o$. Further, this output signal is applied to an arithmetic means 18 to which is also applied an output signal from an inverter 16 which is adapted to invert the set voltage $y_o$ into ($-2y_o$). The output signal ($-2y_o$) from the inverter 16 is added to the output signal from the arithmetic means 13 as follows:

$$(e_r+e_e)\text{max}-(e_r+e_e)\text{min}+2y_o-2y_o=(e_r+e_e)\text{max}-(e_r+e_e)\text{min}.$$

Thus, the arithmetic means 18 generates ($e_e+e_r$)max−($e_r+e_e$)min as an output signal thereof.

Furthermore, the low-pass filter 3 is connected to the terminal 10. Therefore, the output signal ($e_e+e_r$) applied to the low-pass filter 3 which is effective to pass only a low frequency is applied to the peak-to-peak detector 5′, through which a signal representative of the run-out error ($e_e$max−$e_e$min) of the workpiece is detected and applied to an arithmetic means 19. To the arithmetic means 19 is also applied the output signal ($e_r+e_e$)max−($e_r+e_e$)min from the arithmetic means 18, and the following subtraction is carried out:

$$(e_r+e_e)\text{max}-(e_r+e_e)\text{min}-(e_e\text{max}-e_e\text{min})$$

Figure 3B:
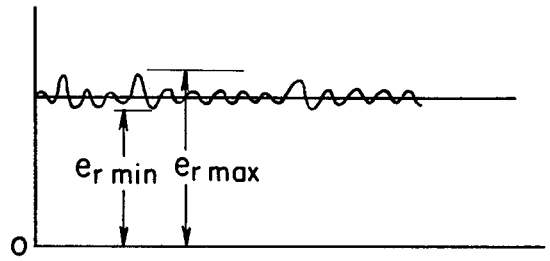
FIG. 3B is a graphical representation illustrating the roundness error measured by the embodiment shown in FIG. 2.

As a result, $e_r$max at or close to this point of $e_e$max−$e_r$min at or close to the point of $e_e$min is detected as an output signal from the means 19 as shown in FIG. 3B. This represents approximately the actual roundness error $e_r$max−$e_r$min of the workpiece and as the waveform of $e_r$, which is produced mostly by chattering during the grinding process, approximates a sine wave and its wave length on the workpiece peripheral surface is far shorter than that of $e_e$, as shown in FIG. 3A, the positional error of the detector is eliminated electrically.

As mentioned above, the apparatus according to the present invention provides means for previously setting a certain voltage corresponding to the positional error of the detector during the sizing or measuring operation. Also, a low-pass filter is provided for eliminating the low frequency signal resulting from run-out or eccentricity of workpieces. The present invention is characterized by the provision of various means for arithmetically operating on the output signal from the detector by means of a peak value-detecting device, an inverter and the low pass filter etc. So that the roundness error of the workpiece which is primarily due to chattering is detected with high efficiency since the positional error of the detector itself is removed electrically with the aid of the arithmetically operated means. As a result, the roundness data measured by the apparatus of the invention can be used to modify and improve the grinding operation and suppress tool chatter.

What is claimed is:

1. An apparatus useable in conjunction with a workpiece detector for measuring the waviness of a workpiece circumferential surface comprising: a first peak-to-peak detector for detecting the maximum absolute value of the sum of a signal representative of the roundnes error and a signal representative of the eccentricity error resulting from the eccentric center of the workpiece, these signals being generated by a workpiece detector which detects the workpiece surface during its rotation during use of the apparatus; a low-pass filter receptive of both signals and effective to pass only the eccentricity error signal; a second peak-to-peak detector for detecting the maximum absolute value of the output signal from said low-pass filter; and an arithmetic means for effecting subtraction of the absolute value of the output signal from said second peak-to-peak detector from that of the first peak-to-peak detector and providing an output signal representative of the maximum roundness error at or close to the point of the maximum eccentricity error.

2. An apparatus useable in conjunction with a workpiece detector for measuring roundness of a workpiece circumferential surface comprising: first arithmetic means for summing a signal representative of the sum of the roundness error and an eccentricity error of a workpiece plus a preset signal having a set voltage corresponding to the positional error of a workpiece detector; a positive peak value-detecting device operative for detecting the maximum value of the output signal from said first arithmetic means; a first inverter receptive of the preset signal and operative to invert the same into one of the opposite polarity; second arithmetic means for summing the output signal from said first inverter and the signal representative of the sum of the roundness error and an eccentricity error; a negative peak value-detecting device operative for detecting the minimum value of the output signal from said second arithmetic means; third arithmetic means for subtracting the output from said negative peak value-detecting device from that of said positive peak value-detecting device; a second inverter receptive of the preset signal and operative to invert the same into one of the opposite polarity and two times the original set value; and fourth arithmetic means for summing the output from said third arithmetic means plus the output from said second inverter and providing an output signal representative of the value of the difference between the maximum and the minimum of the sum of the roundness error and an eccentricity error of the workpiece.

3. An apparatus for measuring the unevenness of a workpiece surface comprising: means defining an input terminal receptive during use of the apparatus of a high-frequency roundness error signal representative of the circumferential unevenness of the workpiece surface and a low-frequency eccentricity error signal representative of the eccentricity of the workpiece center; first peak-to-peak detecting means connected to said input terminal for receiving the roundness and eccentricity signals and detecting therefrom the maximum absolute value of the sum of the signals and providing a corresponding output signal; a low-pass filter connected to said input terminal to receive the roundness and eccentricity signals and having a bandwidth characteristic effective to pass therethrough only the low-frequency eccentricity error signal; second peak-to-peak detecting means connected to said low-pass filter to receive the eccentricity error signal and operative to detect therefrom the maximum absolute value thereof and provide a corresponding output signal; and arithmetic means receptive of both output signals for arithmetically subtracting the output signal from said second peak-to-peak detecting means from that of said first peak-to-peak detecting means and providing a resultant output signal representative of the maximum roundness error at or close to the point of the maximum eccentricity error.

* * * * *